(12) United States Patent
Jolda et al.

(10) Patent No.: US 10,996,841 B2
(45) Date of Patent: May 4, 2021

(54) INTERACTIVE SLIDING TOUCHBAR FOR AUTOMOTIVE DISPLAY

(71) Applicants: Volkswagen AG, Wolfsburg (DE); Audi AG, Ingolstadt (DE)

(72) Inventors: Matthew Jolda, Palo Alto, CA (US); Nils Koetter, Brunswick (DE); William Lathrop, San Jose, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 198 days.

(21) Appl. No.: 13/836,191

(22) Filed: Mar. 15, 2013

(65) Prior Publication Data

US 2014/0282251 A1    Sep. 18, 2014

(51) Int. Cl.
| | | |
|---|---|---|
| *G06F 3/048* | (2013.01) | |
| *G06F 3/0488* | (2013.01) | |
| *B60K 35/00* | (2006.01) | |
| *B60K 37/06* | (2006.01) | |

(52) U.S. Cl.
CPC ............ *G06F 3/0488* (2013.01); *B60K 35/00* (2013.01); *B60K 37/06* (2013.01); *B60K 2370/141* (2019.05); *B60K 2370/145* (2019.05)

(58) Field of Classification Search
CPC .... G06F 3/0485; G06F 3/0482; G06F 3/0481; G06F 1/1647; G06F 1/1641; G06F 3/0488; H04M 2250/16; B60K 35/00; B60K 37/06; B60K 2370/141; B60K 2370/145; B60K 37/04
USPC .............................. 730/830; 701/36; 715/830
See application file for complete search history.

(56) References Cited

U.S. PATENT DOCUMENTS

| | | | | |
|---|---|---|---|---|
| 6,564,661 | B2* | 5/2003 | DeJonge | 74/335 |
| 7,989,725 | B2* | 8/2011 | Boddie et al. | 200/600 |
| 8,025,327 | B1* | 9/2011 | Schowalter | 296/70 |
| 8,070,224 | B2* | 12/2011 | Vitito | 297/217.3 |
| 8,235,162 | B2* | 8/2012 | Wihinen | 180/334 |
| 8,466,871 | B2* | 6/2013 | Ishii | 345/156 |
| 2003/0128103 | A1* | 7/2003 | Fitzpatrick et al. | 340/425.5 |
| 2006/0017326 | A1* | 1/2006 | Hein et al. | 307/10.1 |
| 2007/0052691 | A1* | 3/2007 | Zadesky | G06F 3/0338 345/173 |

(Continued)

FOREIGN PATENT DOCUMENTS

| | | | |
|---|---|---|---|
| DE | 10 2011 010 229 A1 | | 8/2012 |
| EP | 2213501 A2 | * | 8/2010 |

*Primary Examiner* — Alex Olshannikov (74) *Attorney, Agent, or Firm* — Muncy, Geissler, Olds & Lowe, P.C.

(57) ABSTRACT

A console includes a console surface, an interactive touch bar disposed within the console, the touch bar configured to move from a position recessed within the console surface to a position raised above the console surface and the touch bar being configured to receive user touch input, and a proximity sensor disposed on the console surface, the proximity sensor configured to detect a user gesture. The touch bar is configured to rise above the console surface when the proximity sensor detects the user gesture. The interactive surface comprising a capacitive surface zone configured to detect user touch input. The interactive touch surface is configured to receive sliding user input across the interactive touch surface to navigate through content options and is configured to receive pressing user input for selecting the content options.

19 Claims, 8 Drawing Sheets

(56) References Cited

U.S. PATENT DOCUMENTS

| | | | |
|---|---|---|---|
| 2007/0236450 A1* | 10/2007 | Colgate | G06F 3/016 345/156 |
| 2008/0266265 A1* | 10/2008 | Quigley et al. | 345/173 |
| 2009/0079705 A1* | 3/2009 | Sizelove | B64D 11/0015 345/173 |
| 2009/0085383 A1* | 4/2009 | Hicks | B60K 37/06 297/217.3 |
| 2010/0277438 A1* | 11/2010 | Kawashima | B60K 35/00 345/175 |
| 2011/0302532 A1* | 12/2011 | Missig | G06F 3/04883 715/823 |
| 2012/0132746 A1* | 5/2012 | Sizelove | B64D 11/0015 244/118.6 |
| 2013/0270896 A1* | 10/2013 | Buttolo et al. | 307/9.1 |
| 2014/0297105 A1* | 10/2014 | Graumann etal. | 701/36 |

* cited by examiner

INTERACTIVE SLIDING TOUCHBAR FOR AUTOMOTIVE DISPLAY

BACKGROUND OF THE INVENTION

Field of the Invention

The present invention relates to display screen control consoles and, more particularly, to a control console, for an in-vehicle display screen, including a concealable touch bar control.

Description of the Background Art

Figure 1:
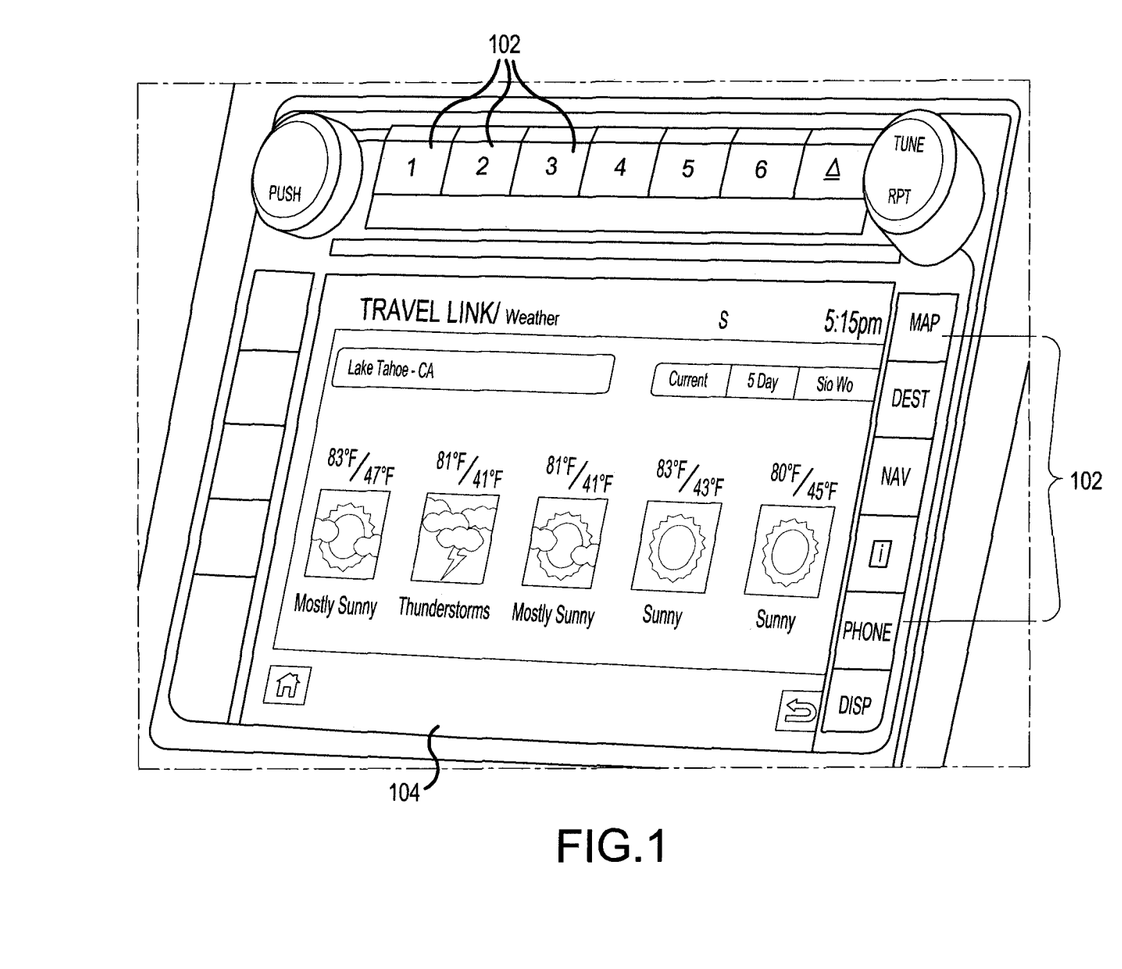
FIG. 1 illustrates a conventional in-vehicle display screen.

As vehicles become more complex machines, so do their displays. FIG. 1 illustrates a conventional, modern display unit. Modern vehicles display much useful information to the user via a headunit or dash mounted display screen. The capabilities of these screens are ever increasing and there is a need to provide new ways to interact with the content on these screens. Such methods include physical hard keys and even gesture recognition. As well, higher-end vehicle brands prefer that the display screen is not used for certain types of interactions due to the fact that finger oils can cause unsightly smudges and messes on the display screens. Thus, there is a need for new methods of interacting with this new content on the display screen.

Currently, touch-screen technology and other existing input technologies have been adapted to interact with the content being displayed on the in-vehicle infotainment and dashboard display screens. The touch-screen interface is a very commonly used interaction method because it creates a direct correlation between the content on the screen and the ability to alter the content by direct input. Similarly, existing systems also use hard keys placed around the edge of the display, which are assigned to each input function of an icon, as is illustrated in FIG. 1. Specifically, hard keys 102 are provided along the edges of the display screen 104, for controlling functions related to items displayed on the display screen.

Other conventional control consoles do not use touch screens. One such conventional arrangement, illustrated in FIG. 2, interacts with the displayed content through a multimedia interface (MMI) knob device. A plurality of hard keys 202 are arranged around a knob 204. The knob 204 and hard keys 202 are configured to allow a user to interact with content displayed on a vehicle display screen (e.g., a dashboard display screen) without touching the screen.

Figure 2:
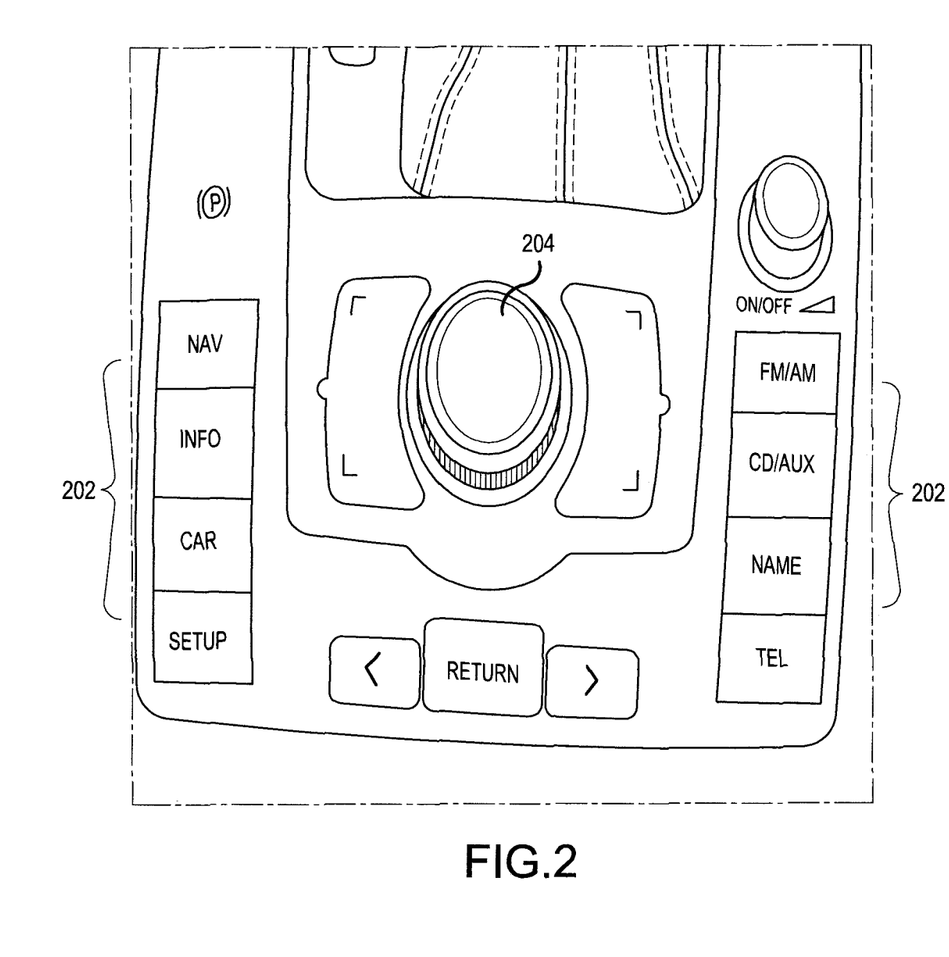
FIG. 2 illustrates a conventional display screen control console.

In both conventional systems illustrated in FIGS. 1 and 2, the interactive elements (e.g., hard keys, knobs, etc.) are always visible. The visible interactive elements often take away from the overall aesthetics of an interior of a premium, higher-end vehicle.

DE 10 2011 010 229 A1 discloses an apparatus for operating a plurality of different functions of a motor vehicle with a touch sensitive display surface. The apparatus includes a display surface arranged in a vehicle console. The display surface has two spaced apart display surface portions with a plurality of symbols displayed on each surface portion. Each symbol represents a different component in the vehicle. Accordingly, a user may control several vehicle components using the single touch sensitive display surface. The display surface, however, is positioned on the vehicle console and is always visible. Thus, similar to the interactive elements in FIGS. 1 and 2, the display surface takes away from the overall aesthetics of the interior of the vehicle.

SUMMARY OF THE INVENTION

In view of the foregoing and other exemplary problems, drawbacks, and disadvantages of the conventional methods and structures, an exemplary feature of the present invention is to provide a concealable touch bar control, which is separate from the display screen thus preventing smudges and messes on the corresponding display screen and which improves the overall aesthetics of a vehicle interior by retracting into a console surface when not being used.

In accordance with a first exemplary, non-limiting aspect of the present invention, a touch bar includes an interactive touch surface. The interactive touch surface includes a capacitive surface configured to detect user touch input for controlling a vehicle mounted display screen. The interactive touch surface is configured to receive sliding user input across the interactive touch surface to navigate through content options and is configured to receive pressing user input for selecting the content options.

In accordance with a second exemplary, non-limiting aspect of the present invention, a console includes a console surface, an interactive touch bar disposed within the console, the touch bar configured to move from a position recessed within the console surface to a position raised above the console surface and the touch bar being configured to receive user touch input, and a proximity sensor disposed on the console surface, the proximity sensor configured to detect a user gesture. The touch bar is configured to rise above the console surface when the proximity sensor detects the user gesture.

In accordance with a third exemplary, non-limiting aspect of the present invention, a system includes a display screen and a console. The console includes a console surface, an interactive touch bar disposed within the console, the touch bar configured to move from a position recessed within the console surface to a position raised above the console surface and the touch bar being configured to receive user touch input, and a proximity sensor disposed on the console surface, the proximity sensor configured to detect a user gesture. The touch bar is configured to rise above the console surface when the proximity sensor detects the user gesture.

Accordingly, the present invention is able to prevent smudges and other messes on the display screen by providing a separate touch bar control for operating the display screen. Additionally, the overall aesthetics of the vehicle interior are maintained because the touch bar is configured to retract into the console surface to a concealed position when the touch bar is not being used.

The touch bar is configured such that it may be placed anywhere in the vehicle (e.g., center tunnel). The touch bar is configured to raise up from the surface as the user's hand/finger approaches the touch bar. Accordingly, the touch bar provides the advantage of concealing the interactive elements when interaction is not necessary. Thus, the interactive element (e.g., touch bar) is not visible when not being used. The touch bar is configured to be used with other information displays in the vehicle and does not require a dedicated display. The touch bar may also contain several inputs in one sliding mechanism, rather than using several sliding buttons. Once the touch bar is raised up, the segments on the touch bar correspond to the active icons displayed on the screen. The user is able to slide a finger across the touch bar to highlight the desired icon on the screen without having to look at the touch bar wherever it may be placed. Once the user is satisfied with the selection, the user simply presses forward on the touch bar as the user would with a physical hard key and the touch bar will "click" confirming that the user has pressed the button choosing the highlighted choice. The touch bar also can be used to change the context of the icons simply by swiping a finger across the surface of the touch bar. If the user swipes a finger to the left or right, the icons on the screen will also jump to the next set of icons in the corresponding direction. From here, the user can highlight a new icon and push to select it, or keep swiping to reveal more icon sets.

The touch bar provides a new and unique interaction method, which can either supplement or even place the use of a touchscreen display. The touch bar can also be placed anywhere within the vehicle such that the content can be interacted with from anywhere in the car, whereas a touchscreen limits the input to just the display area. The touch bar is also more intuitive to interact with such displayed content than the conventional knob system illustrated in FIG. 2. Such a device, although incorporating the existing methods of push-buttons and swipe gestures, is completely new for interacting with displayed content in cars.

There is no conventional technology that implements the above features whereby a physical touch bar appears when necessary and retracts back into a surface while the display associated with the touch bar and the surrounding area remains stationary.

BRIEF DESCRIPTION OF THE DRAWINGS

The present invention will become more fully understood from the detailed description given hereinbelow and the accompanying drawings which are given by way of illustration only, and thus, do not limit the present invention, and wherein.

DETAILED DESCRIPTION

Referring now to the drawings, and more particularly to FIGS. 3A-8, there are shown exemplary embodiments of the method and structures according to the present invention.

Figure 3A:
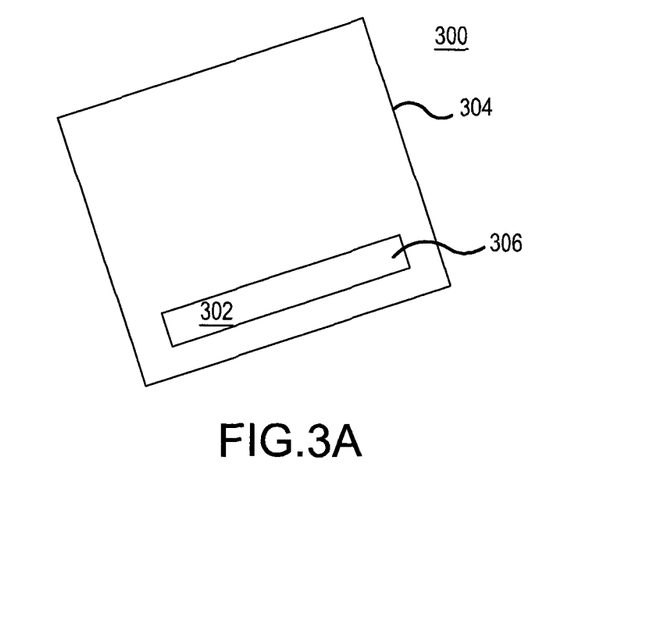
FIG. 3A illustrates a touch bar 302 in a retracted position according to certain exemplary embodiments of the present invention.
Figure 3B:
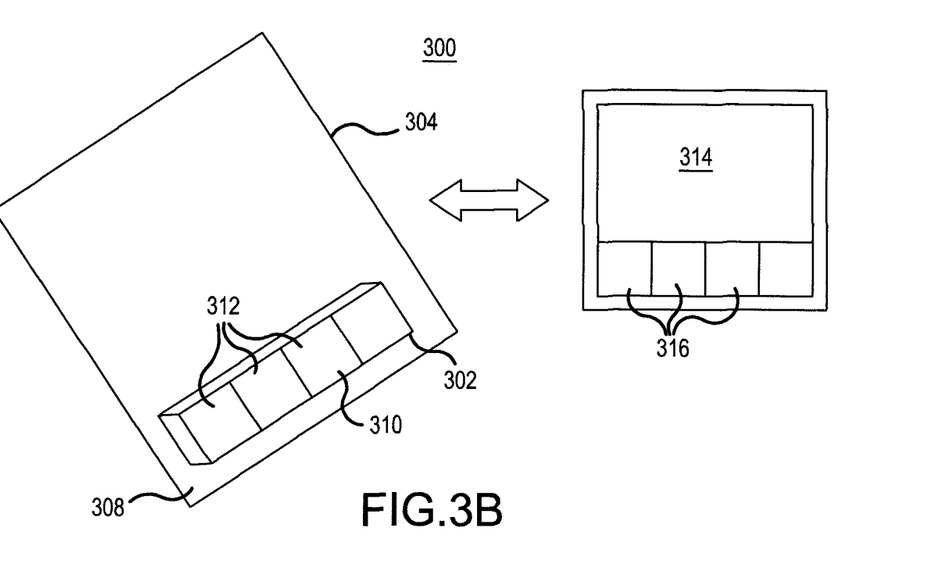
FIG. 3B illustrates a touch bar 302 in a raised position according to certain exemplary embodiments of the present invention.

FIGS. 3A and 3B illustrate a touch bar configuration 300 according to certain exemplary embodiments of the present invention. FIG. 3A illustrates the touch bar 302 in a retracted, concealed position (i.e., an inactive position). When the touch bar 302 is not in use, it is maintained in the retracted, concealed position. In this position, the touch bar 302 is concealed within a surface 304 of a vehicle console. Furthermore, in this position, a top surface 306 of the touch bar is flush with the surface 304 of the console. The touch bar 302 comprises a narrow, rectangular body having a length greater than its width and height.

The system illustrated in FIGS. 3A and 3B also includes a sensor 308 for detecting the presence of a user input gesture (e.g., detects motion of a user hand/finger approaching the touch bar). The sensor may be positioned on the surface of the console adjacent to the touch bar 302. Alternatively, the sensor may be positioned on the top surface 306 of the touch bar 302. According to certain exemplary embodiments of the invention the sensor 308 may include a proximity sensor. Alternatively, the sensor may include an infrared sensor, motion sensor, or any other suitable type of sensor. When the sensor 308 detects the presence of a user input gesture (e.g., user finger, hand, etc.) the system enters an interactive mode and the touch bar 302 raises (e.g., automatically raises) from the console surface.

FIG. 3B illustrates the touch bar 302 in a raised position. In the raised position, the touch bar is in an interactive-ready mode. As detailed above, the touch bar 302 raises to a position above the console surface 304. The touch bar 302 includes an interactive surface 310 disposed along a front surface of the touch bar 302 (i.e., the surface exposed when raised from the console surface). The interactive surface 310 includes a capacitive surface including one or more interaction zones 312. Furthermore, additional interactive zones can also be integrated into the top edge of the touch bar such that it is active when the button top edge is flush with the console surface (i.e., in the concealed position).

According to certain exemplary embodiments of the invention, the touch bar 302 is configured to control functions associated with a display screen 314. The display screen 314 may itself include a touch screen and may be incorporated in the console adjacent the touch bar 302, in a vehicle dashboard, or in a vehicle head unit, etc. The display screen 314 includes a plurality of interactive icons 316 displayed on the display screen 314. Each of the interaction zones 312 on the touch bar 302 corresponds to one of the icons 316 on the touch screen. Accordingly, the user may access and control the display screen at a more convenient position.

Figure 4A:
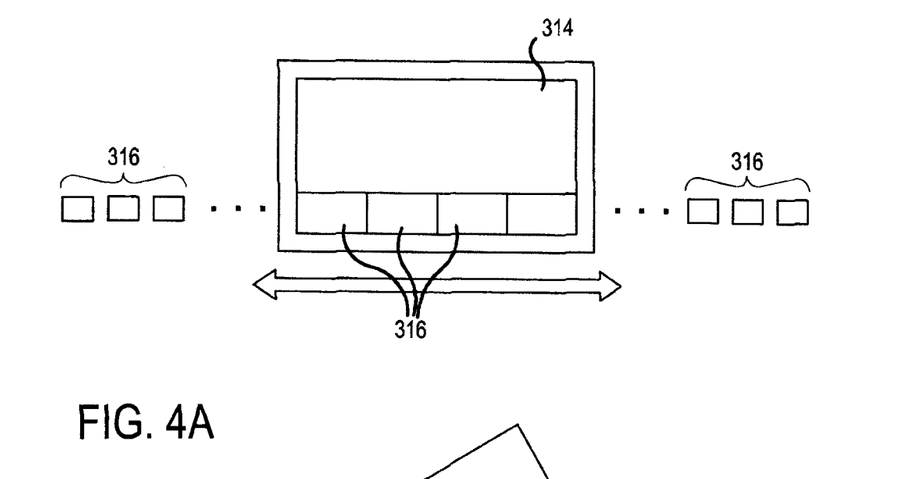
FIGS. 4A and 4B illustrate a user swiping interaction with the touch bar illustrated in FIGS. 3A and 3B.
Figure 4B:
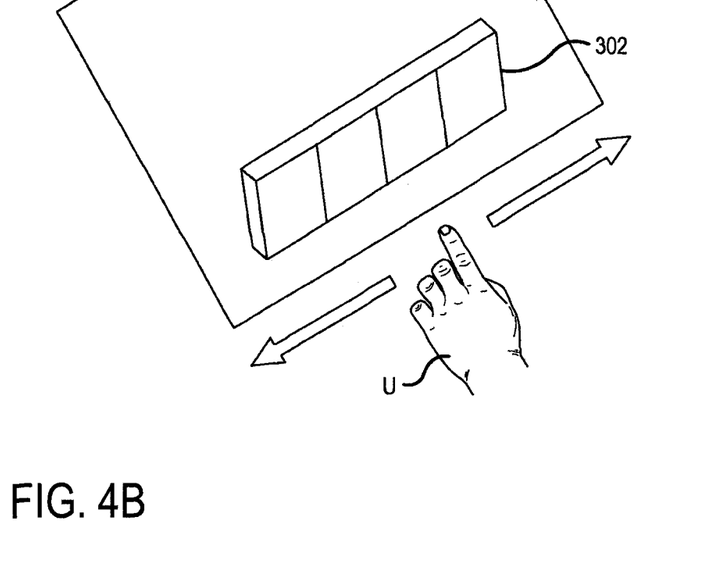
Figure 5A:
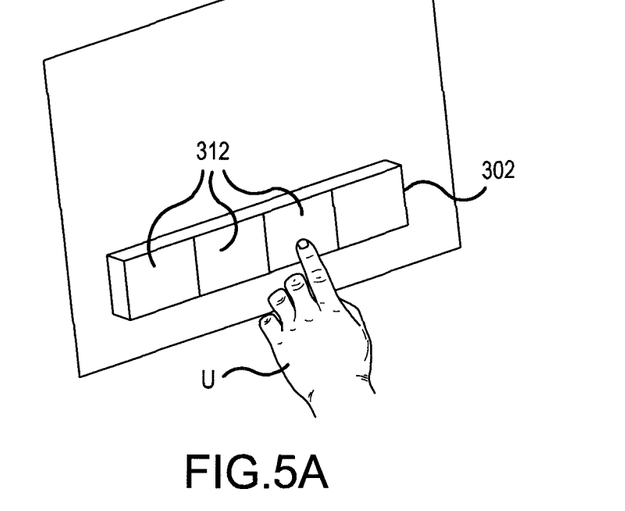
FIGS. 5A and 5B illustrate a user pressing interaction with the touch bar illustrated in FIGS. 3A and 3B.
Figure 5B:
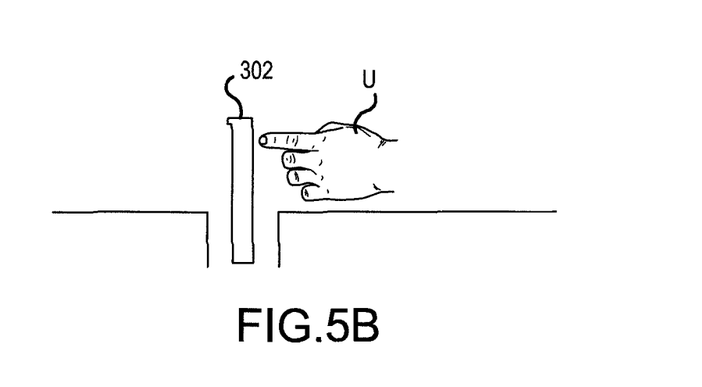

The touch bar 302 is configured to accept both user swiping motion and user pressing motion. FIGS. 4-5B illustrate the two motion types.

FIG. 4 illustrates the swiping motion on the touch bar 302. As is illustrated in FIG. 4, the user U is able to swipe across the surface of the touch bar 302. The swiping motion allows a user to scroll through content options. As the user U scrolls, the content options in the interactive zone change. Also, the icons 316 on the display screen 314 change as the user U scrolls along the touch bar 302. Accordingly, the user U is able to access additional icons not initially displayed on the touch screen 314 and the touch bar 302.

FIGS. 5A and 5B illustrate the user pressing motion. Once user finds a desired icon, the user presses or "clicks" the corresponding interaction zone 312 on the touch bar 302 to select the desired icon 316 on the display screen 314.

Figure 6A:
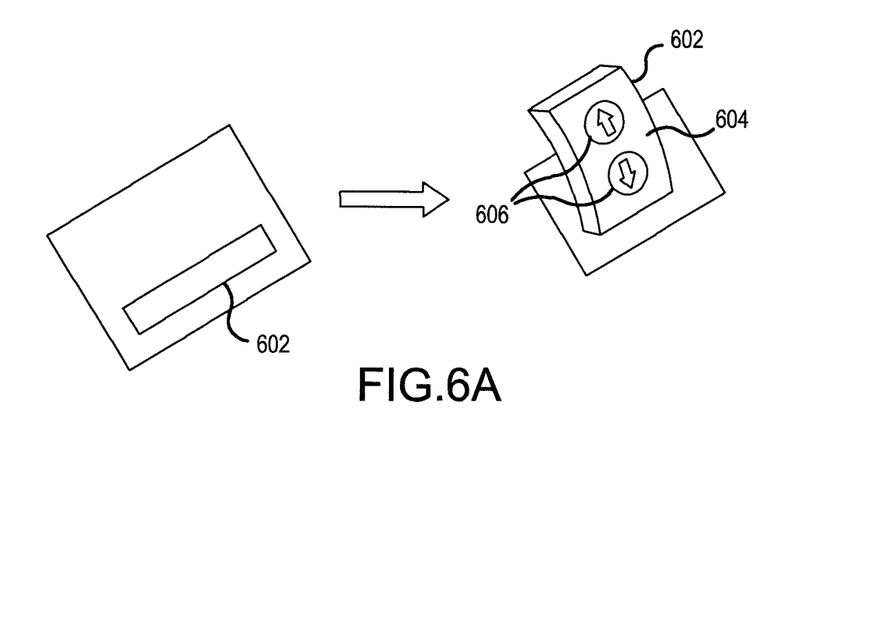
FIGS. 6A and 6B illustrate an alternative embodiment of the touch bar.
Figure 6B:
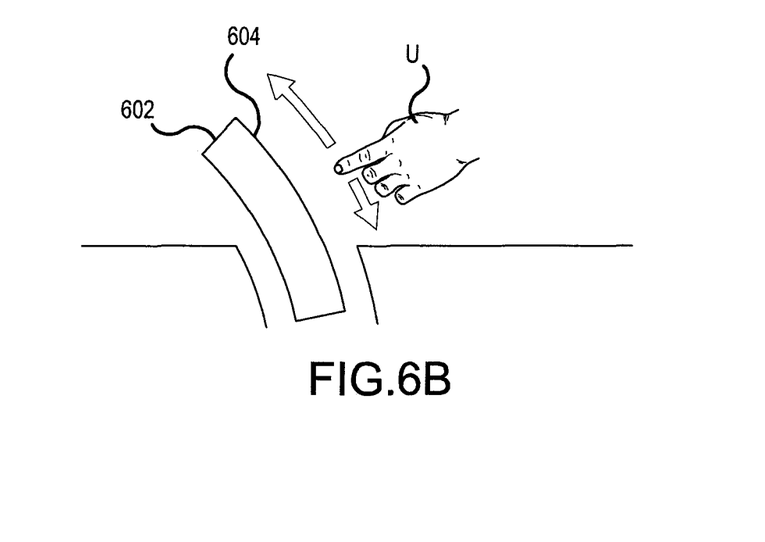

FIGS. 6A and 6B illustrate an alternative embodiment of the present invention. As illustrated in FIG. 6A, the touch bar can include a single button touch bar 602. The touch bar 602 includes an interactive surface 604 having a capacitive surface (e.g., a capacitive sensor incorporated into the interactive surface). The interactive surface 604 includes at least one interaction zone 606.

FIG. 6B illustrates the operation motions with respect to the single button touch bar 602. The touch bar 602 is configured to accept swiping motion across the interactive surface 604. Additionally, the single button touch bar 602 may accept press/"click" to confirm input as well. In the exemplary embodiment illustrated in FIGS. 6A and 6B, the single button touch bar is configured to control volume for the vehicle entertainment system. The volume may be changed by either swiping up and down along the interactive surface 604 or by pressing individual volume up and/or volume down interactive zones 606. The button 602 illustrated in FIGS. 6A and 6B may include multiple zones 606 to perform functions such as changing audio volume, radio stations, temperature, or fan speed. Furthermore, zones can also be integrated into the top edge of the button such that it is active when the button top edge is flush with the console surface. Thus, it is not necessary for the button 602 to toggle or switch as the input can be performed using the touch surface capacitive zones 606. Additionally, the touch button 602 can be configured to receive pressing or clicking input from the user. The moving input surface has the ability to operate as a single control or be combined with other surfaces in one control element to control multiple features.

The capacitive touch zone, which is positioned on the face of the button or touch bar that is exposed when the button or touch bar is raised from the surface of the console, may include a single input or a series of inputs. The interactive touch bar 302 is made up of several of the touch buttons 602. The touch bar 302 is a single piece of material that is configured to raise from the console surface when a user (e.g., user hand, user finger, etc.) is near the touch bar 302. As detailed above, the detection of the user can be by capacitive proximity sensing, infrared sensing, or any other suitable sensing means. As the touch bar 302 raises from the console surface 304, the touch bar 302 becomes an interactive element. As the user slides a finger across the interactive zones, the icon head display screen changes accordingly. This allows the touch bar 302 to be placed anywhere in the vehicle, as the user does not have to look at the touch bar 302 to interact with it. Instead, the user merely has to look at the icons on the display or instrument cluster, which are in a better viewing range.

Once the user has highlighted a desired icon, the user simply presses forward on the touch bar 302. The touch bar 302 is then configured such that the entire touch bar moves forward, acting like a push button switch.

The interactive zones on the touch bar can be sized to correspond to the icons on the display screen, allowing a direct correlation between the button zone and the selected icon. The touch bar may act as an alternative input device for selecting elements displayed on the display screen. That is, the display screen and the touch bar may each provide touch-based controls. Alternatively, the touch bar may entirely replace the touch screen interaction.

The touch bar is not limited to merely controlling functions displayed on the console display screen. The touch bar may also be configured to control the context icons on the instrument cluster display. Switching between input context can be done using any existing technology (e.g., gaze control, physical switch, proximity detection, etc.).

Figure 7:
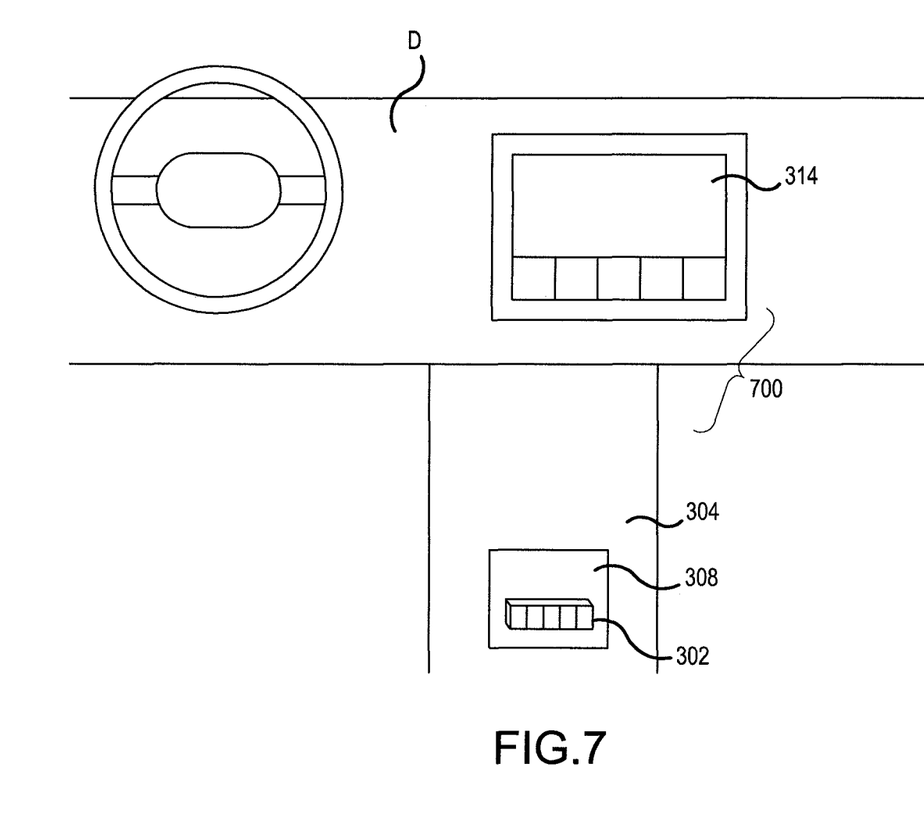
FIG. 7 illustrates a system 700 according to certain exemplary embodiments of the present invention.

FIG. 7 illustrates a vehicle interior including a console 700 according to certain exemplary embodiments of the present invention. The console 700 includes a touch bar 302 and a sensor 308 disposed on a console surface 304 and a display 314. In the exemplary arrangement illustrated in FIG. 7, the display 314 is disposed within the vehicle dashboard D. The display 314, however, may be disposed anywhere within the vehicle interior (e.g., over head display, instrument cluster, etc.). Furthermore, in the exemplary arrangement illustrated in FIG. 7, the touch bar 302 is disposed in a central console between the driver and passenger seats. Again, the touch bar 302 may be positioned anywhere in the vehicle passenger compartment. For example, the touch bar 302 may be placed in a console in the rear seat portion of the passenger compartment. Placing the touch bar in the rear seat provides additional interaction opportunities. For example, the rear seat passenger could select the front display screen (e.g., infotainment screen) and control the inputs on the screen. Alternatively, the rear seat passenger could use the touch bar to control rear seat display screens or even a rear seat docked mobile device (e.g., phone, computer, tablet device, etc.). Finally, it is noted that more than one touch bar may be incorporated into the vehicle passenger compartment.

Figure 8:
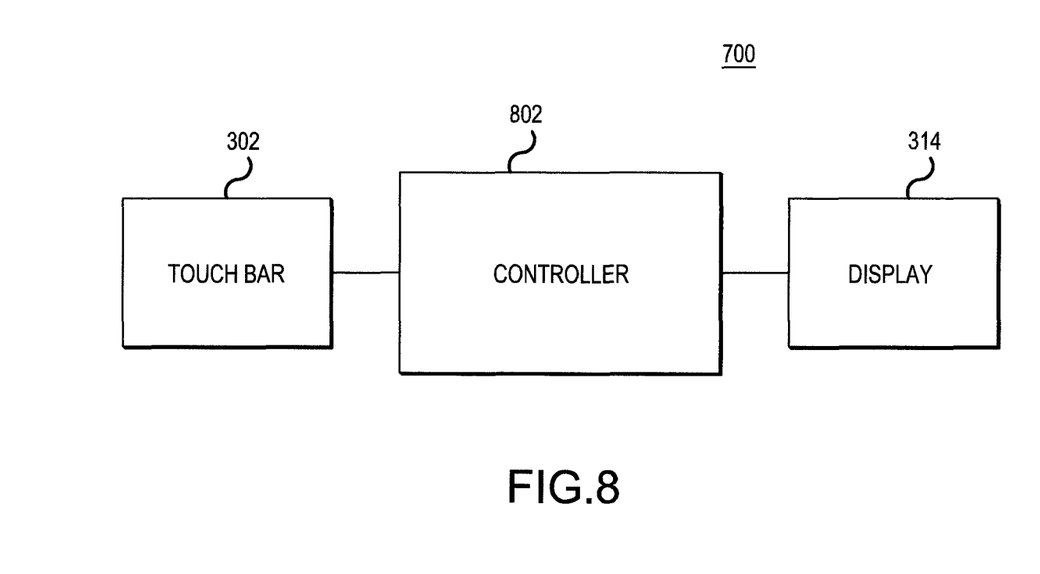
FIG. 8 illustrates a block diagram of the system 700.

FIG. 8 illustrates a block diagram of the system 700 incorporating the touch bar 302 according to an exemplary embodiment of the present invention. The system 700 includes the touch bar 302, the display 314, and a controller 802 configured to transmit a signal from touch bar 302 to the display 314 upon receiving a user input on the touch bar 302. The controller 802 is configured to detect and interpret the specific motion of the user input (e.g., swiping, pressing, etc.) and transmit a corresponding signal to the display 314 to control the input provided to the display 314. The controller 802 may include a specifically configured computer processor or may be incorporated into the overall computer system of the vehicle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A touch bar, comprising:
an exposed top side that rises vertically above a surface of a console, in an interactive mode;
at least one concealed surface of the touch bar that extends substantially perpendicularly to the exposed top side, the at least one concealed surface being exposed in the interactive mode, at least a portion of the at least one concealed surface being configured as an interactive touch surface; and
the interactive touch surface comprising a capacitive surface having a plurality of interactive zones, each interactive zone including a content option, configured to detect user touch input for controlling a separate vehicle-mounted display screen, each interactive zone corresponding to an interactive icon on the separate vehicle-mounted display screen,
wherein a sensor disposed on the console is configured to activate the interactive mode,
wherein the interactive touch surface is configured to receive sliding user input across the interactive touch surface to navigate through the content options and is configured to receiving pressing user input for selecting the content options, and
wherein upon receiving the sliding user input the content options in the interactive zones change to provide additional interactive icons not initially presented on the separate vehicle-mounted display screen and not initially associated with the interactive touch surface,
wherein the exposed top side includes additional interactive zones, the additional interactive zones being active at least in a concealed position of the touch bar, the concealed position being when the at least one concealed surface is disposed within the console, the additional interactive zones receiving touch input and controlling features of the separate vehicle-mounted display screen.

2. The touch bar according to claim 1, wherein the sensor configured to detect a presence of a user input gesture.

3. The touch bar according to claim 1, wherein upon receiving the pressing user input, an entirety of the interactive touch bar moves forward.

4. The touch bar according to claim 1, wherein the interactive touch bar is a rectangular body having a length greater than its width and its height.

5. The touch bar according to claim 1, wherein the at least one concealed surface is substantially perpendicular to the surface of the console.

6. The touch bar according to claim 1, wherein the touch bar is used to navigate other information displays and the separate vehicle-mounted display screen.

7. The touch bar according to claim 1, wherein in the interactive mode, the exposed top side is in a first plane and the surface of the console is in a second plane, the first plane and the second plane being different planes, the first plane and the second plane being parallel.

8. The touch bar according to claim 1, wherein movement from a concealed mode to the interactive mode is in a direction substantially perpendicular to a plane of the surface of the console.

9. A console, comprising:
a display including a plurality of interactive icons;
a console surface;
an interactive touch bar disposed within the console in a concealed position and physically separate from the display, the interactive touch bar configured to move from the concealed position recessed within the console surface to an exposed position raised above the console surface and the interactive touch bar being configured to receive user touch input to control the display in the exposed position, the interactive touch bar comprising an interactive touch surface having a plurality of interactive zones, each interactive zone including a content option, each interactive zone corresponding to one of the plurality of interactive icons; and
a sensor configured to detect a user gesture,
wherein an exposed top surface of the interactive touch bar is configured to rise vertically above the console surface when the sensor detects the user gesture,
wherein at least one concealed surface of the interactive touch bar extends substantially perpendicular to the exposed top surface, the at least one concealed surface being exposed in the exposed position, at least a portion of the at least one concealed surface being configured as the interactive touch surface,
wherein the interactive touch bar is configured to receive sliding user input across the interactive touch surface to navigate through the content options and is configured to receive pressing user input for selecting the content options, and
wherein upon receiving the sliding user input the content options in the interactive zones change to provide additional interactive icons not initially presented on the display and not initially associated with the interactive touch surface,
wherein the exposed top surface includes additional interactive zones, the additional interactive zones being active at least in the concealed position of the interactive touch bar, the additional interactive zones receiving touch input and controlling the display.

10. The console according to claim 9, wherein the sensor is disposed on the interactive touch bar.

11. The console according to claim 9, wherein the sensor comprises a proximity sensor.

12. The console according to claim 9, wherein the interactive icons change with the interactive zones.

13. The touch bar according to claim 9, wherein the at least one concealed surface is substantially perpendicular to the console surface.

14. The touch bar according to claim 9, wherein movement from the concealed position to the exposed position is in a direction substantially perpendicular to a plane of the console surface.

15. A system, comprising:
a display screen including a plurality of interactive icons; and
a console, the console comprising:
a console surface;
an interactive touch bar disposed within the console in a concealed position, the interactive touch bar configured to move from the concealed position recessed within the console surface to an exposed position raised above the console surface and the interactive touch bar being configured to receive user touch input for controlling content on the display screen, the interactive touch bar comprising an interactive touch surface having a plurality of interactive zones, each interactive zone including a content option, each interactive zone corresponding to one of the plurality of interactive icons; and
a sensor disposed on the console surface, the sensor configured to detect a user gesture,
wherein an exposed top surface the interactive touch bar is configured to vertically rise above the console surface when the sensor detects the user gesture,
wherein at least one concealed surface of the interactive touch bar extends substantially perpendicular to the exposed top surface, the at least one concealed surface being exposed in the exposed position, at least a portion of the at least one concealed surface being configured as the interactive touch surface, wherein the interactive touch bar is physically separate from the display screen,
wherein the interactive touch bar is configured to receive sliding user input across the interactive touch surface to navigate through the content options and is configured to receive pressing user input for selecting the content options, and
wherein upon receiving the sliding user input the content options in the interactive zones change to provide additional interactive icons not initially presented on the display screen and not initially associated with the interactive touch surface,
wherein the exposed top surface includes additional interactive zones, the additional interactive zones being active at least in the concealed position of the interactive touch bar, the additional interactive zones receiving touch input and controlling the display screen.

16. The system according to claim 15, wherein, when the interactive touch bar is recessed, the exposed top surface of the interactive touch bar is flush with the console surface.

17. The system according to claim 15, wherein, when the interactive touch bar is recessed, an entirety of the interactive touch surface is concealed from view.

18. The touch bar according to claim 15, wherein the at least one concealed surface is substantially perpendicular to the console surface.

19. The touch bar according to claim 15, wherein movement from the concealed position to the exposed position is in a direction substantially perpendicular to a plane of the console surface.

* * * * *